Feb. 29, 1944.  H. O. WILLIAMS ET AL  2,342,914
DEEP WELL SCREEN
Original Filed April 15, 1940
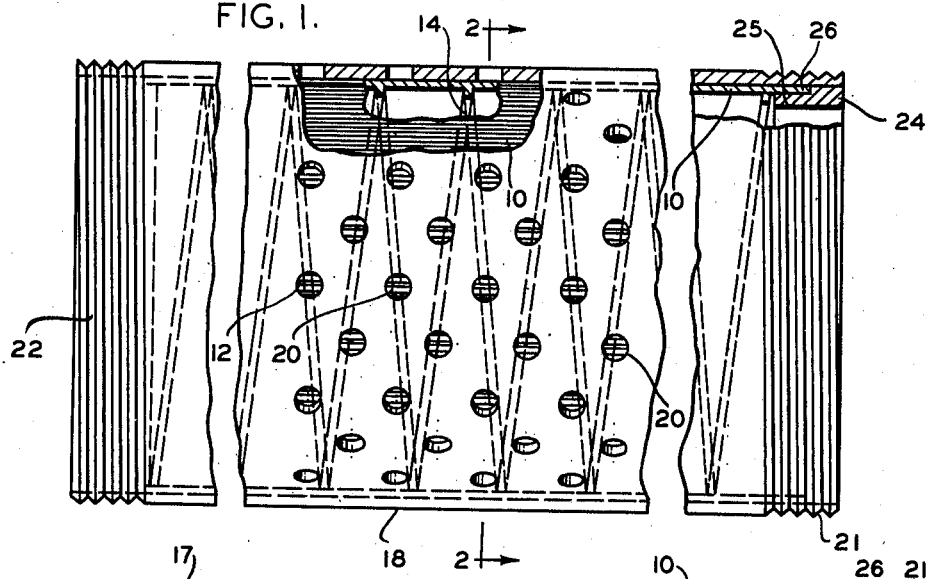
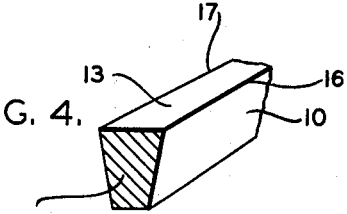
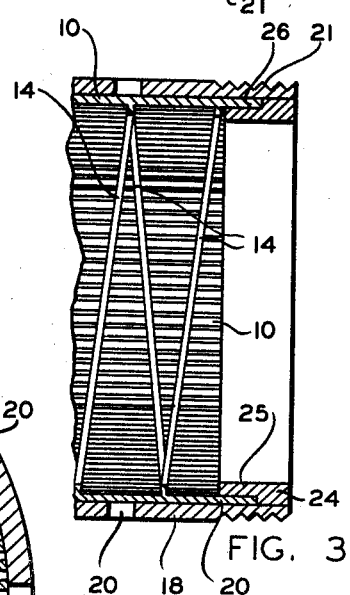
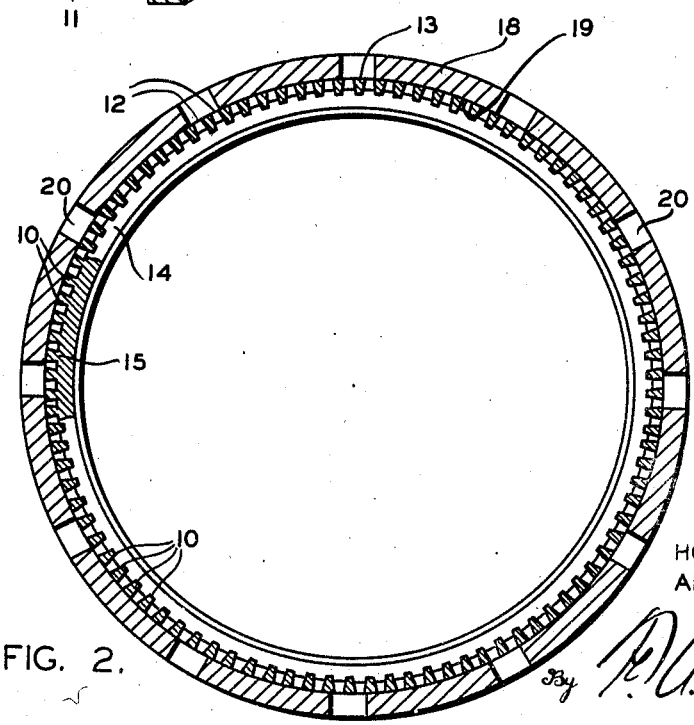
Inventor
HOWARD O. WILLIAMS
ALBERT A. JENS Patented Feb. 29, 1944

2,342,914

UNITED STATES PATENT OFFICE 2,342,914

DEEP WELL SCREEN

Howard O. Williams, Minneapolis, and Albert A. Jens, St. Paul, Minn., assignors to Edward E. Johnson, Incorporated, St. Paul, Minn.

Original application April 15, 1940, Serial No. 329,751, which is a division of application Serial No. 222,410, August 1, 1938. Divided and this application September 18, 1942, Serial No. 459,063

2 Claims. (Cl. 166—5)

Our invention relates to deep well screens and has for its object to provide a well screen of the strongest possible construction capable of resisting the most severe stresses in setting the screen in deep wells and great pressures of the liquid being screened such as are met with in very deep oil wells.

It is well-known that in certatin types of oil wells the pressure of the oil is itself sometimes sufficiently great to tear to pieces and destroy strainer means of deep well screens. Under such conditions the area of screening surface is of less importance than to have it strong enough to sustain such heavy pressures and at the same time effectively hold out the sands in which the bodies of oil subject to such pressures are usually contained.

We have discovered that the strongest possible screening device for this purpose may be obtained by providing an inner integrated cellular screen structure consisting of flat faced longitudinally extended screening elements on the outside welded to the coils of an inner supporting member at every crossing point and to unite therewith by heat shrinking thereon a heavy integral inner pipe base formed with a multiplicity of round apertures or holes of substantial diameter so that the strong screening means formed by the longitudinal screen forming members are substantially integrated with the pipe base and pass across the holes therethrough on the inside of the pipe base.

It will be understood that the inner integrated well screen structure may for uses where heavy pressures are not encountered be employed without the outer surrounding pipe base. That is, it provides a well screen having an outer screening surface formed of longitudinal members whose flat outside faces are disposed so as to outline a cylinder positioned so that their edges form drainage slots of suitable widths and with the sides of said screen elements converging inwardly to provide inwardly diverging slots, said longitudinal members being welded to a supporting wire helically wound on the inside thereof and welded to the longitudinal members at their crossing points.

It is a principal object of our invention therefore to provide a well screen wherein the screening members are not only within a perforated pipe base but have their surfaces extending across the perforations or holes through said pipe base in the plane of the inner wall thereof and in turn are rigidly united and reenforced by means welded to the inside of the strainer elements.

It is a further object of our invention to provide a well screen of the type above mentioned wherein an inner screen member is formed of longitudinal elements welded to a helically wound supporting member on the inside thereof at every crossing point and having a perforated pipe base heat shrunk upon the outer limits of such a fabricated well screen member.

It is a further object of our invention to provide a well screen of the type above mentioned wherein a cylindrical screening surface is produced by a multiplicity of longitudinal flat top wires having inwardly converging side walls and spaced apart at their edges to form inwardly diverging drainage slots and rigidly secured in a fabricated cellular well screen member by being welded at every crossing point to the helical coils of a supporting wire contacting and welded to the inner limits of each of the screening wires.

It is a further object of our invention to provide a well screen wherein the inner screening portion has heat shrunk thereon an outer heavy tubular pipe base formed with a multiplicity of holes of substantial diameter so that the bottoms of said holes will be bridged by the aforesaid inwardly diverging slots of the main screen member.

This application is a division of our application Serial Number 329,751 filed April 15, 1940, which is a division of Serial Number 222,410 filed August 1, 1938.

The full objects and advantages of our invention are fairly indicated in the description given in detail in the appended specification, and the novel features of the invention by which the valuable and advantageous objects and results above noted are accomplished are particularly pointed out in the claims.

In the drawing illustrating an application of our invention in one form—

Fig. 1 illustrates in plan, with some parts broken away and in section, a well screen embodying the features of our invention.

Fig. 2 is a transverse sectional view taken on line 2—2 of Fig. 1 viewed in the direction of the arrows.

Fig. 3 is a longitudinal sectional view through the center of one end of our improved well screen.

Fig. 4 is a perspective sectional fragmentary view of one of the longitudinal wires used to produce the screening surface.

As illustrated and shown in the drawing a multiplicity of prefabricated strainer elements or rods 10 having the cross-sectional shape indicated at 11 in Fig. 4 are spaced apart to produce drainage slots 12. The flat top wider surface 13 of these strainer elements are turned outwardly so that the drainage slots 12 diverge inwardly, as clearly shown in Fig. 2. The width of slots indicated in the drawing is illustrative only, for it is obvious and is the practice in building such well screens to determine the width of slots either narrower or wider by the character of work which the well screen will have to perform.

To hold the strainer elements 10 a wire 14 of any desired cross-section is formed in a helix on the inside of the strainer elements 10 and the successive coils of this helix are welded to and integrated with the elements 10 as shown at 15 in Fig. 1. The welding is effected at every crossing point of the helical coils over the inner limits of the screen-forming members 10 and the welding is effected so that the parts are sunk together and made integral, as shown at 15, producing an integrated cylindrical well screen structure which is in effect a cellular structure in that the longitudinal elements and the helical coils within the cylinder outlined by the longitudinal elements have become integrated at a large number of places, and thus form a unitary metallic structure.

It will be noted that the outer flat surfaces 13 of the longitudinal screening elements 10 lie substantially in a cylindrical plane, although mathematically only the edges 16 and 17 are in this plane and the flat faces 13 lie in the arcs between said edges. An outer pipe base 18, of heavy tubing, at normal temperatures has a diameter somewhat less than the diameter of the cylinder outlined by the outer faces 13 of the screen-forming elements 10. This pipe base 18 is expanded by heating so that its inner surface may be applied over the outer limits of the faces 13, where, as stated above, the cylindrical inner surface of the pipe base will contact the edges 16 and 17 of the flat faces 13 of screen-forming elements 10. When the pipe base 18 cools, after being so applied, its shrinkage will slightly deform the edges 16 and 17 and to an extent sink them into the flat metal of the pipe base and bring the faces 13 into full contact with the inner cylindrical surface 19 of the pipe base, thus substantially integrating the screen member, formed of the longitudinal elements 10 and the helically wound supporting member 14 welded thereto at every crossing point, with the pipe base itself. In effect this means integrating the longitudinal strainer elements 10 with the inner cylindrical surface 19 of the pipe base 18.

The pipe base 18 has formed therein a multiplicity of round apertures or holes 20. As clearly shown in Fig. 1 the holes 20 are positioned in longitudinal and circumferential rows, the holes being staggered for all adjacent rows. The holes are of a diameter more than double the width of faces 13 so that in each instance one or more slots 12, usually all or parts of three such slots, will extend across the bottoms of the holes. The ends of the pipe base 18 itself are threaded as indicated at 21 and 22 of Figs. 1 and 3, and the threaded portion is reenforced by an inner ring 24 which has an annular extension 25 contacting the inner margins of the ends 26 of the longitudinal screen-forming elements 10.

The advantages of our invention will be apparent from the foregoing description. The particular and primary advantage is that a structure is provided having an effective screening surface so constructed and held in relation to the openings through the outer perforated strong tubular pipe base as to be able to resist the highest pressures of the fluid as deep well oil in which the screen is used. The pipe base is tremendously reenforced by the cellular screen member to which the pipe base is substantially integrated by the shrinking action above referred to. The screening elements are subjected to the high pressures encountered only across the short diameters of the slots themselves. These elements 13 are strong of themselves and have exceptional support, and for such distances they are capable of resisting enormous pressures.

The slots diverge inwardly so that any grains of sand or other material capable of passing between adjacent edges 16 and 17 of the longitudinal elements 10 will pass on through and very quickly the holes 20 in the body of the pipe base walls will be filled with granular material too large to pass through these slots. Even though the area of strainer surface is relatively restricted the well screen will nevertheless be efficient and have good capacity, because the high outside pressure encountered will move the oil through the restricted strainer area very rapidly.

Furthermore the inner screen member is capable of a very high degree of efficiency in use independently of the outside pipe base, where it is employed in ordinary water wells with no excessive setting strains to be dealt with and no marked pressure of fluid being screened.

We claim:

1. A deep well screen, comprising a cylindrical screening member formed of a multiplicity of longitudinally extended rods spaced apart to form longitudinal drainage slots between all pairs of said rods, a supporting member laid helically within said cylinder so as to contact the inner limits of said longitudinal rods and welded to each of them at each crossing point thereof, and an integral tubular pipe base contacting with its inner surface the outer limits of said screening member and shrunk thereon so as to be immovably secured thereto, said pipe base being formed with a multiplicity of inlet openings, said openings being crossed on the inside of the pipe base by the slots of the screening member.

2. A deep well screen, comprising a cylindrical screening member formed of a multiplicity of longitudinal flat-topped rods with inwardly converging side walls spaced apart to form longitudinal inwardly diverging drainage slots between all pairs of said rods, supporting means laid in spaced coils within said cylinder so as to contact the inner limits of said longitudinal rods and welded to each of them at each crossing point thereof, and an integral tubular pipe base contacting with its inner surface the edges of said flat surfaces and drainage slots and shrunk thereon so as to cause said edges to be made substantially integral with the pipe base, said pipe base being formed with a multiplicity of inlet openings, said openings being crossed at the inside of the pipe base by the slots of the screening member.

HOWARD O. WILLIAMS.
ALBERT A. JENS.